(12) United States Patent  
Lim et al.

(10) Patent No.: US 8,897,993 B2
(45) Date of Patent: Nov. 25, 2014

(54) DETECTION SYSTEM FOR FRONT-MOUNTED MID-PTO DRIVEN IMPLEMENTS

(75) Inventors: Tien Chuong Lim, Evans, GA (US); Chad Leighton Helland, Knoxville, TN (US)

(73) Assignee: Deere & Company, Moline, IL (US)

( * ) Notice: Subject to any disclaimer, the term of this patent is extended or adjusted under 35 U.S.C. 154(b) by 533 days.

(21) Appl. No.: 13/349,894

(22) Filed: Jan. 13, 2012

(65) Prior Publication Data

US 2013/0184962 A1    Jul. 18, 2013

(51) Int. Cl.
 *B60K 25/02* (2006.01)
 *B60K 25/06* (2006.01)

(52) U.S. Cl.
 USPC ............. 701/104; 123/198 DB; 180/53.6; 180/53.7

(58) Field of Classification Search
 CPC ... B60K 25/02; B60K 25/06; B60Y 2200/221
 USPC ............. 701/104; 123/198 DB, 198 DC; 180/53.6, 53.61, 53.62, 53.7
 See application file for complete search history.

(56) References Cited

U.S. PATENT DOCUMENTS

| | | |
|---|---|---|
| 5,203,440 A | 4/1993 | Peterson, Jr. et al. |
| 5,542,493 A | 8/1996 | Jacobson et al. |
| 5,616,964 A | 4/1997 | Peterson, Jr. |
| 5,994,857 A | 11/1999 | Peterson, Jr. et al. |
| 6,942,595 B2 * | 9/2005 | Hrazdera ........................ 477/37 |
| 7,131,509 B2 | 11/2006 | Harvey et al. |
| 7,399,255 B1 * | 7/2008 | Johnson et al. ................ 477/42 |
| 7,631,719 B2 * | 12/2009 | Wenthen ....................... 180/243 |
| 8,483,927 B2 * | 7/2013 | Matsuzaki et al. ............. 701/93 |
| 2002/0023794 A1 | 2/2002 | Pierce et al. |
| 2009/0029826 A1 * | 1/2009 | Eguchi et al. ................... 477/39 |
| 2011/0232979 A1 | 9/2011 | Schulz et al. |
| 2012/0191307 A1 * | 7/2012 | Matsuzaki et al. ............. 701/51 |

* cited by examiner

*Primary Examiner* — Erick Solis

(57) ABSTRACT

A detection system for front-mounted mid-PTO driven implements includes a sensor positioned adjacent a shaft connected between a mid-PTO driveshaft and a front mounted-implement. A controller may be electrically connected to the sensor, to a fuel pump solenoid, and to a reverse sense switch that indicates to the controller if a reverse pedal is actuated. When the controller receives a signal indicating the reverse pedal is actuated, the controller does not shut off the fuel pump solenoid if the controller also receives pulse signals from the sensor within a specified frequency range based on a desired PTO speed, but shuts off the fuel pump solenoid if the controller does not receive pulse signals from the sensor or receives pulse signals from the sensor outside the specified frequency range.

11 Claims, 2 Drawing Sheets

DETECTION SYSTEM FOR FRONT-MOUNTED MID-PTO DRIVEN IMPLEMENTS

FIELD OF THE INVENTION

This invention relates generally to compact utility tractors having a mid-power take off for driving front mounted implements, and more specifically to detecting front-mounted mid-PTO driven implements that may be used while a tractor is in reverse.

BACKGROUND OF THE INVENTION

Mid-size or compact utility tractors may include an interlock circuit with several functions including prevention of mid-PTO operation when the transmission of the tractor is operated in reverse. For example, if the mid-PTO is engaged and the tractor is in reverse, an interlock circuit may kill the engine, stop or prevent engagement of the PTO, and/or stop rotation of mower blades in a belly mounted mower deck. Under certain circumstances, however, operation of the mid-PTO while the tractor is in reverse may be necessary or desired. This may be referred to as a reverse implement option. Various override or bypass systems have been proposed for this purpose. Some of the override or bypass systems also may be referred to as latch circuits, which typically require the operator or driver to actuate one or more switches.

For example, U.S. Pat. No. 5,994,857 assigned to Deere & Company of Moline, Ill., relates to an interlock circuit having several relays and a hand operated PTO switch provided with a momentary on (or override) position to allow operation of a mid-PTO while the tractor travels in reverse. U.S. Pat. No. 6,316,891, also assigned to Deere & Company, describes an interlock circuit having only a single relay, and an override or bypass system that does not require the operator to continuously push or hold the hand operated PTO switch to permit mid-PTO operation while in reverse.

Front mounted mid-PTO driven implements may be used on mid or compact utility tractors. Examples of front mounted mid-PTO driven implements include but are not limited to snow blowers and rotary brooms. Some front mounted mid-PTO driven implements may be safely operated with the tractor in reverse. To continue operating the implement with the tractor in reverse, the operator may use the reverse implement option. However, the operator may find it inconvenient or difficult to actuate one or more switches each time the tractor is in reverse.

There is a need for a detection system for front-mounted mid-PTO driven implements that simplifies operation of the implement while the tractor is in reverse. There is a need for operating a front-mounted mid-PTO driven implement without requiring the operator to actuate a reverse implement option switch.

SUMMARY OF THE INVENTION

A detection system for front-mounted mid-PTO driven implements includes a variable reluctance or Hall effect sensor mounted to a front hitch that supports a front-mounted implement. A mid-PTO driveshaft may be connected by a shaft to the front-mounted implement, with the shaft adjacent the variable reluctance or Hall effect sensor. An electronic controller may be electrically connected to the variable reluctance or Hall effect sensor and a reverse pedal sensor. The controller allows rotation of the mid-PTO shaft while the reverse pedal is actuated if the controller receives signals from the variable reluctance or Hall effect sensor within a specified frequency range. The detection system simplifies operation of the implement while the tractor is in reverse, and does not require the operator to actuate a reverse implement option switch.

DESCRIPTION OF THE PREFERRED EMBODIMENT

Figure 1:
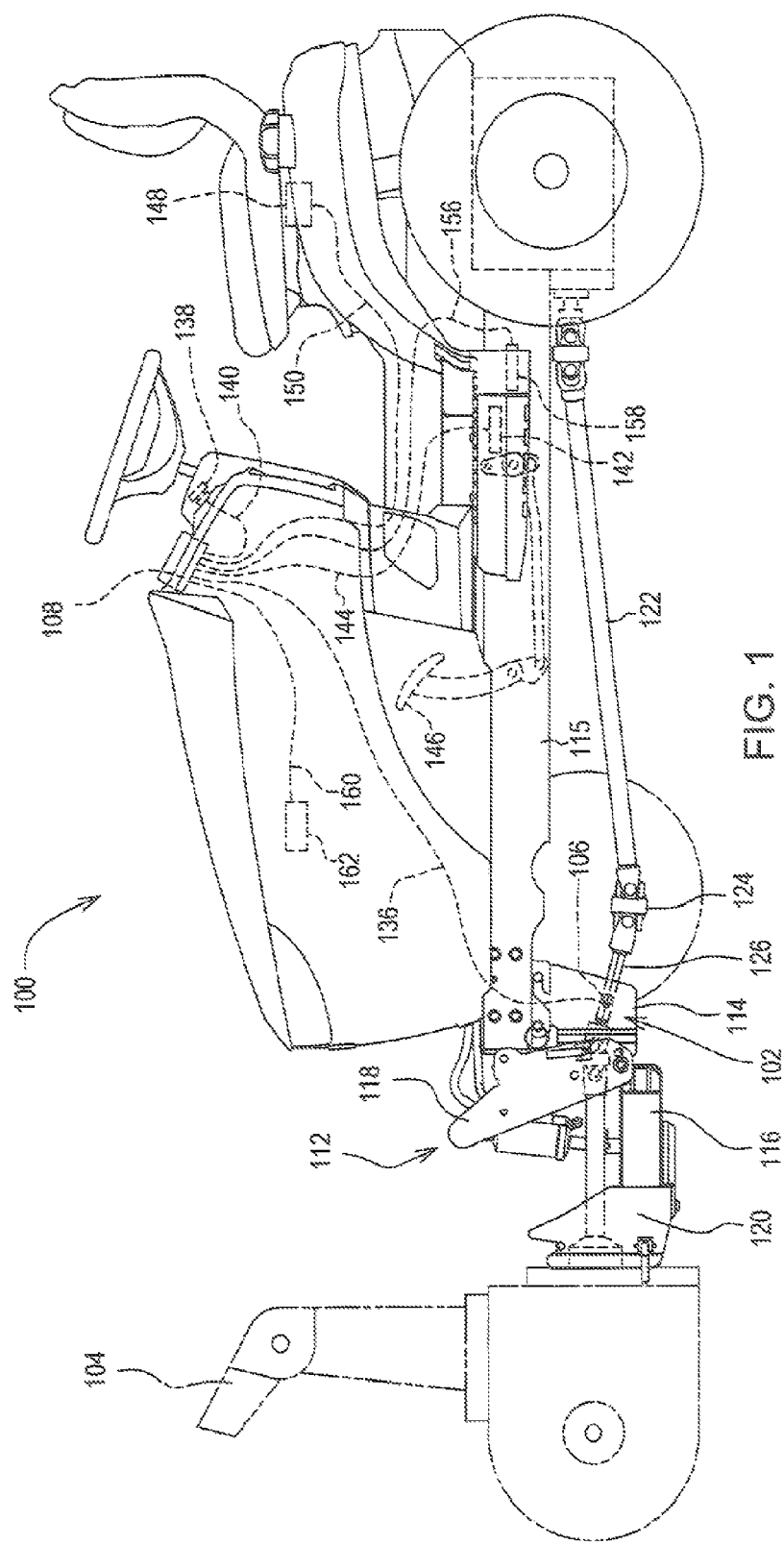
FIG. 1 is a side view of a compact utility tractor with a detection system for front-mounted mid-PTO driven implements according to a first embodiment of the invention.
Figure 2:
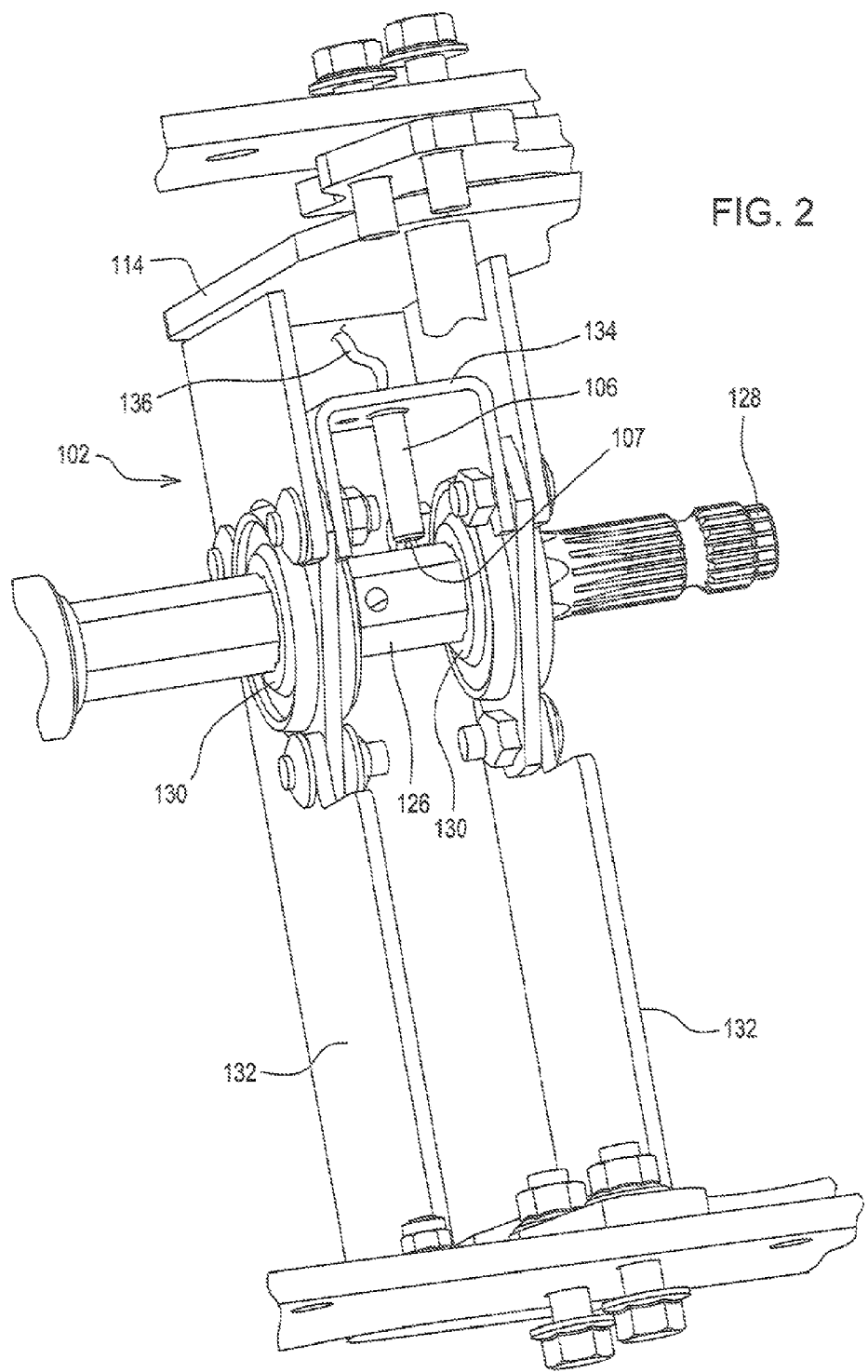
FIG. 2 is a perspective view of a sensor for use with a detection system for front-mounted mid-PTO driven implements according to a first embodiment of the invention.

In the embodiment of FIG. 1, utility tractor 100 is equipped with detection system 102 for front-mounted mid-PTO driven implements such as snow blower 104 or a rotary broom. The detection system may include sensor 106 which may be a variable reluctance or Hall Effect sensor that sends out a pulse train signal having a known frequency when a front-mounted mid-PTO driven implement is operated. More specifically, the sensor may send out a pulse train signal of a known frequency to tractor controller 108 if the sensor detects rotation of shaft 126 driving a front-mounted implement.

In one embodiment, a front-mounted mid-PTO driven implement may be attached to the tractor using front hitch 112. The front hitch may include bracket 114, pivot frame 116, and support 118 mounted to front frame members 115 of the tractor. Angling frame 120 may be pivotably mounted to pivot frame 116 with a bolt or pin and bushing. The front-mounted mid-PTO driven implement may be supported by the pivot frame primarily.

In one embodiment, mid-PTO driveshaft 122 may have a first or rearward end with a yoke connected by a coupling or universal joint to the mid-PTO takeoff located under the tractor and forwardly of the tractor's rear wheels. The mid-PTO driveshaft may have a second or forward end having a yoke connected by coupling or universal joint 124 to shaft 126 at or near the front end of the tractor. The forward or front end 128 of shaft 126 may be splined for engagement with a front-mounted PTO driven implement. The cross section of shaft 126 may have a plurality of sides and may be supported by flanged housings 130 with ball bearings that may be attached to one or more cross members 132 of bracket 114. For example, the cross section of shaft 126 may have four, five sides, or six or more sides. Alternatively, the shaft cross section may be round. Optionally, magnets may be equally spaced on each side or around the circumference of the shaft which may be detected by sensor as the shaft rotates.

In one embodiment, sensor 106 may be a variable reluctance or Hall effect sensor mounted to and supported by bracket 134, which may be a U-shaped bracket attached to and/or extending between cross members 132 of bracket 114. The end 107 of sensor 106 may be positioned less than about 10 mm from shaft 126, and most preferably less than about 5 mm from shaft 126. The sensor may be connected to tractor controller 108 by electrical line 136. Sensor 106 may provide a signal of six pulses for each full revolution of shaft 126. The variable reluctance or Hall effect sensor may provide a non-contacting omni-directional sensor that detects the gap between the end of the sensor and the spinning shaft. For example, at each peak of a hexagonal shaft, the gap may be about 1.8 mm, and between each peak the gap may be between about 3 mm and about 5 mm. Thus, the sensor should be capable of detecting a difference of between about 2 mm and about 3 mm. The shaft may be made from a ferrous material that will affect a magnetic field.

In one embodiment, the detection system also may include electronic controller 108 which may be mounted in or near the instrument panel or at any other suitable location on the tractor. Electronic controller 108 may include software and/or logic that determines if a pulse signal received from sensor 106 may be within a specified frequency range. For example, the controller may determine if the signal is within a specified frequency range of between about 65 Hz and about 260 Hz. As another example, if the rated RPM of the PTO is 2100 rpm, which is achieved by an engine RPM of 3200 rpm, the controller may determine if the engine speed is in a range between about 1500 rpm and about 3500 rpm.

In one embodiment, controller 108 also may receive input signals from PTO switch 138 on the dashboard or operator station of the tractor through electrical line 140 indicating if the mid-PTO is actuated. Additionally, the controller may receive input signals from reverse sense switch 142 through electrical line 144 indicating if reverse pedal 146 is actuated. The controller also may receive input signals from seat switch 148 through electrical line 150 indicating if an operator is seated.

In one embodiment, PTO switch 138 also may include a reverse override position and/or function that an operator may use to provide a signal to electronic controller 108 allowing operation of a mid-mounted implement while the tractor is in reverse. The controller may be connected by electrical line 156 to PTO solenoid 158, and by electrical line 160 to fuel pump shut off solenoid 162. The controller may provide electrical signals through line 156 to engage or disengage the PTO solenoid, and through line 160 to shut off the fuel pump solenoid to stop or kill the engine.

In one embodiment, if controller 108 receives a signal from sensor 106 in the specified frequency range while the PTO is actuated and the tractor is in reverse, the controller may not disengage PTO solenoid 158 and/or may not shut off fuel pump solenoid. Additionally, if the controller receives a signal indicating PTO switch 138 is in the reverse override position while the PTO is actuated and the tractor is in reverse, the controller may not disengage PTO solenoid 158 and/or may not shut off fuel pump solenoid.

In one embodiment, if controller 108 does not receive a signal from sensor 106, or receives a signal from sensor 106 outside the specified frequency range while the tractor is in reverse, the controller may disengage PTO solenoid 158 and/or shut off fuel pump solenoid 162 to kill the engine. Additionally, if the controller receives a signal from sensor 106 in the specified frequency range while the PTO is actuated and the tractor is in reverse, but seat switch 148 indicates no operator is seated, the controller may disengage PTO solenoid 158 and/or shut off fuel pump solenoid 162.

Having described the preferred embodiment, it will become apparent that various modifications can be made without departing from the scope of the invention as defined in the accompanying claims.

We claim:

1. A detection system for front-mounted mid-PTO driven implements comprising:
    a sensor positioned adjacent a shaft connected between a mid-PTO driveshaft and a front mounted-implement, the sensor providing pulse signals as the shaft rotates; and
    a controller electrically connected to the sensor, to a fuel pump solenoid, and to a reverse sense switch that indicates to the controller if a reverse pedal is actuated, so that when the controller receives a signal indicating the reverse pedal is actuated, the controller does not shut off the fuel pump solenoid if the controller also receives pulse signals within a specified frequency range based on a desired PTO speed, but the controller shuts off the fuel pump solenoid if the controller does not receive pulse signals from the sensor or receives pulse signals from the sensor outside the specified frequency range.

2. The detection system for front-mounted mid-PTO driven implements of claim 1 wherein the sensor is mounted to a bracket supporting the shaft.

3. The detection system for front-mounted mid-PTO driven implements of claim 1 wherein the sensor is a variable reluctance sensor.

4. The detection system for front-mounted mid-PTO driven implements of claim 1 wherein the sensor is a Hall effect sensor.

5. The detection system for front-mounted mid-PTO driven implements of claim 1 further comprising a PTO switch electrically connected to the controller, the PTO switch may be moved to a reverse override position in which the controller does not shut off the fuel pump solenoid when the reverse pedal is actuated.

6. A detection system for front-mounted mid-PTO driven implements comprising:
    a variable reluctance sensor mounted to a front hitch that supports a front-mounted implement;
    a mid-PTO driveshaft connected by a shaft to the front-mounted implement;
    a reverse pedal sensor; and
    an electronic controller electrically connected to the variable reluctance sensor and the reverse pedal sensor, the controller allowing rotation of the mid-PTO shaft while the reverse pedal is actuated if the controller receives signals from the variable reluctance sensor within a specified frequency range.

7. The detection system for front-mounted mid-PTO driven implements of claim 6 wherein the controller is electrically connected to a fuel pump solenoid that the controller shuts off if no signals are received from the variable reluctance sensor or the signals are outside the specified frequency range.

8. The detection system for front-mounted mid-PTO driven implements of claim 6 wherein the controller is electrically connected to a PTO solenoid that the controller disengages if no signals are received from the variable reluctance sensor or the signals are outside the specified frequency range.

9. The detection system for front-mounted mid-PTO driven implements of claim 6 further comprising a mid-PTO switch electrically connected to the controller and having a reverse override position allowing rotation of the mid-PTO shaft while the reverse pedal is actuated.

10. A detection system for front-mounted mid-PTO driven implements comprising:
    a reverse pedal sensing switch that is actuated if a reverse pedal is actuated; and
    an electronic controller receiving pulse signals from a sensor mounted next to a shaft driving a front-mounted mid-PTO driven implement, the electronic controller being electrically connected to a fuel pump solenoid that the electronic controller shuts off if the reverse pedal is actuated and pulse signals are not received from the sensor indicating the shaft is rotating within a specified range of rotational speeds.

11. The detection system for front-mounted mid-PTO driven implements of claim 10 further comprising a PTO switch electrically connected to the electronic controller and having a reverse override position that allows the shaft to rotate in the absence of pulse signals from the sensor within a specified range of rotational speeds.

* * * * *